United States Patent [19]

Ferron-Zepeda

[11] Patent Number: 4,979,439
[45] Date of Patent: Dec. 25, 1990

[54] ROTISSERIE

[76] Inventor: Ernesto O. Ferron-Zepeda, Calle Lopez Lucio, #956, Colonia La Mesa TiJuana, Mexico

[21] Appl. No.: 380,035

[22] Filed: Jul. 14, 1989

[51] Int. Cl.$^5$ .................. A47J 37/00; A47J 37/04
[52] U.S. Cl. .................. 99/421 R; 99/421 H; 99/473; 99/479; 99/421 V
[58] Field of Search ........... 99/341, 345, 346, 347, 99/467, 473, 477, 479, 389, 391, 393, 395, 421 R, 419, 421 V, 421 H; 126/41 A, 41 R, 21 A

[56] References Cited

U.S. PATENT DOCUMENTS

| | | | |
|---|---|---|---|
| 2,537,378 | 1/1951 | Staltare | 99/393 |
| 2,549,019 | 4/1951 | Saunders | 99/341 |
| 2,581,570 | 1/1952 | Amanatides | 99/421 V |
| 3,474,724 | 10/1969 | Jenn | 126/41 |
| 3,524,403 | 8/1970 | Treloar | 99/479 |
| 3,736,860 | 6/1973 | Vischer, Jr. | 99/477 |
| 4,300,443 | 11/1981 | Morcos et al. | 99/353 |
| 4,492,216 | 1/1985 | Dumont | 99/479 |
| 4,590,848 | 5/1986 | Willingham | 99/419 |
| 4,810,856 | 3/1989 | Jovanovic | 99/419 |

FOREIGN PATENT DOCUMENTS

| | | | |
|---|---|---|---|
| 687231 | 5/1964 | Canada | 99/330 |
| 2043546 | 3/1972 | Fed. Rep. of Germany | 126/21 A |

Primary Examiner—Timothy F. Simone
Attorney, Agent, or Firm—Henri J. A. Charmasson

[57] ABSTRACT

A rotisserie for the controlled cooking of chicken carcasses or other meats in which a planar meat holding rack is rotatively mounted within a circular chamber. The planar rack is held in a generally vertical plane with carcasses mounted on either side of the rack. The rack rotates about a horizontal axis passing through its center of gravity, thus exposing the carcasses to two broilers mounted in the opposite walls of the chamber equidistantly from the rack. In the base of the rotisserie, a boiler generates a steady stream of steam which is injected into the cooking chamber to prevent charring of the meat and provide for a more even and thorough cooking. A injecting tool allows the operator of the rotisserie to spray or inject sauces or seasonings into the carcasses before or after cooking.

9 Claims, 2 Drawing Sheets

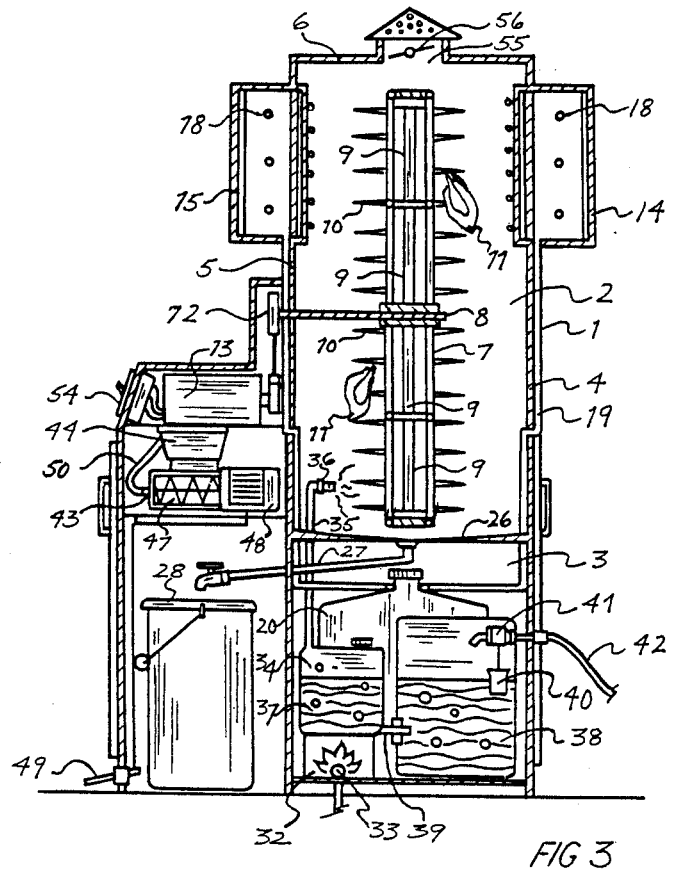
FIG 3
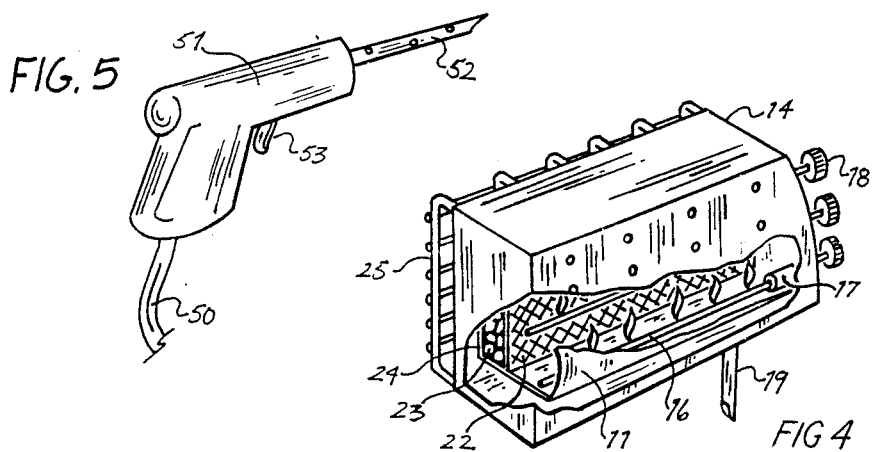
FIG. 5
FIG 4 ature of the meat surface. These problems may be partly palliated by using thinner cuts of meat. But this solution is not available when large cuts such as carcasses of chickens or other fowls must be cooked whole.

ROTISSERIE

BACKGROUND OF THE INVENTION

This invention relates to cooking equipment for food products. More specifically, this invention relates to rotisseries in which carcasses of chickens or other meats are rotatively and sequentially exposed to a source of heat.

The popularity and success of so-called "fast food" service establishments has created a demand for new types of food preparation appliances which can be operated by individuals with no particular culinary skills, but which yet can yield food products of high and consistent quality. Conventional rotisseries used in the cooking of chicken carcasses and other meats have traditionally used a relatively low-heat and long-period process to guarantee an even and thorough cooking without flame charring. These conventional rotisseries are ill-adapted to the "fast food" industry which cannot tolerate long delays in cooking. Raising the cooking temperature may expedite the process, but results in uneven cooking and sometime burning of the meat surface. These problems may be partly palliated by using thinner cuts of meat. But this solution is not available when large cuts such as carcasses of chickens or other fowls must be cooked whole.

Accordingly, there has been a reed for an improvement in the design and operation of rotisseries which would assure a rapid and even cooking of large cuts of meat without requiring attentive supervision or particularly skilled operators.

There is also a need for cooking appliances that are sturdy, easy to operate and to maintain. It is also desirable that such a cooking appliance include the facilities for conducting ancillary activities such as the dressing of the meats.

SUMMARY OF THE INVENTION

The principal and secondary objects of the invention are to provide a rotisserie for the rapid and even cooking of large cuts of meat while avoiding surface burning or charring;

to provide a rotisserie which can be operated by an individual without any special culinary skill; and to provide a rotisserie particularly adapted to the needs of the fast food industry.

These and other objects are achieved by means of a rotisserie having a circular or drum-shaped cooking chamber in which the cuts of meat which can be as large as whole carcasses of chicken or other fowls, are mounted on a circular rack which rotates in a vertical plane equidistant from gas broilers mounted in the opposite walls of the cooking chamber. A steam generator maintains a high level of humidity within the cooking chamber. The humidity level allows for the use of higher cooking temperatures which expedites the cooking process, while preventing the charring of the meat. A sauce or spice injector is also provided to dress the meat prior to or after cooking. The entire apparatus is enclosed in a convenient cabinet which provides for easy maintenance.

DESCRIPTION OF THE DRAWING

FIG. 3 is a median cross-sectional view of the rotisserie;

FIG. 4 is a perspective view of one of the broilers with cutaway portions exposing the inside arrangement; and FIG. 5 is a perspective view of the sauce or spice injector.

DESCRIPTION OF THE PREFERRED EMBODIMENT OF THE INVENTION

Figure 1:
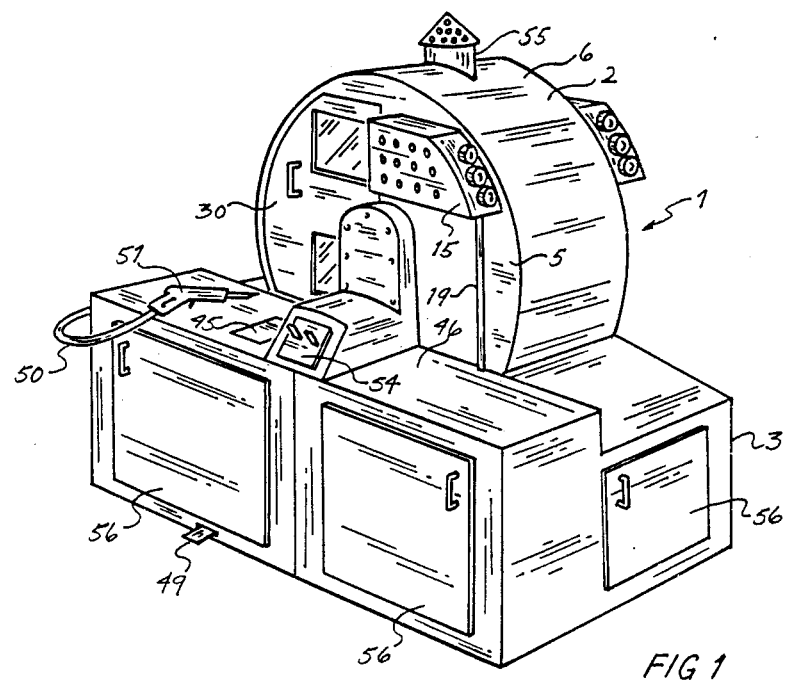
FIG. 1 is a perspective view of the preferred embodiment of the invention exposing the front and right side of the rotisserie.
Figure 2:
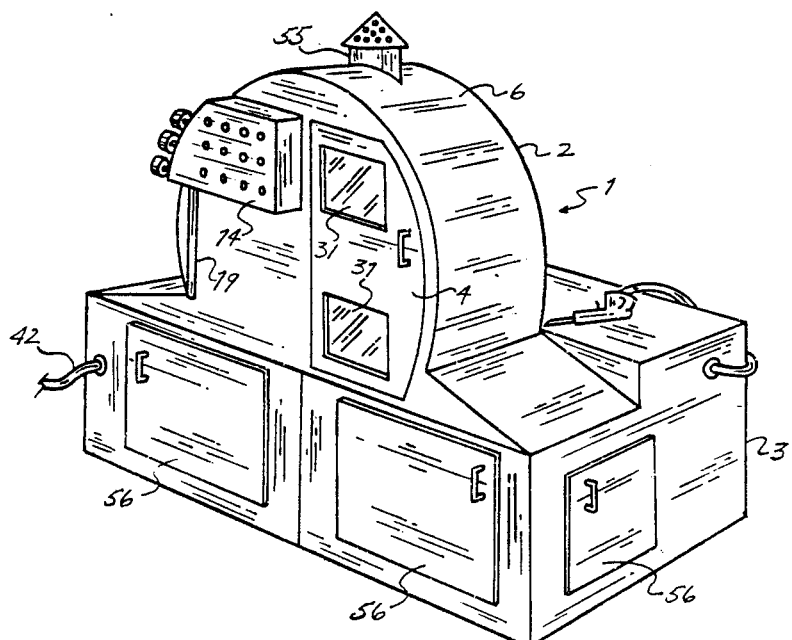
FIG. 2 is a perspective view exposing the back and left side of the rotisserie.

Referring now to the drawing, there is shown as the preferred embodiment of the invention, a self-contained rotisserie and associated equipment. The rotisserie comprises a cylindrical or drum-shaped cooking chamber 2 which is mounted on a base receptacle 3 which houses some of the associated equipment. The cooking chamber 2 is defined by two vertical and parallel circular walls 4, 5 joined by a cylindrical shroud 6. Inside the cooking chamber, a rotating rack 7 is fixedly mounted on a horizontal shaft 8 which passes through the center of one of the circular walls an through the center of gravity of the rack. The rack 7 comprises a wheel with spokes having spikes 10 which are regularly spaced apart and adapted for holding animal carcasses or other meat products 11. The carcasses 11 may be impaled on the spikes 10 or secured therebetween by straps or other convenient devices. The rack 7 rotates in a vertical plane equidistant and parallel to the two vertical walls 4, 5. The shaft 8 is linked to a pulley-and-belt mechanism 12 driven by an electrical motor 13 to impart approximately five revolutions per minute to the rack 7.

Mounted in an upper quadrant of each circular wall 4, 5 is a broiler 14, 15. Each broiler, as more specifically illustrated in FIG. 4 comprises three rod-type gas burners 16 mounted horizontally on top of one another. Each burner is controlled by a valve 17 with a manual adjustment knob 18. The valves 17 are supplied by a common gas line 19 which is connected to a propane tank 20 housed in the base 3. Each burner 16 lies between a reflector 21 and a screen 22, the screen is formed by a layer of volcanic rocks 23 held between two grates 24. The flames from the burners extend into the screen 22 heating the volcanic rocks 24. The inner face of each broiler opens into the cooking chamber 2. A grid 25 is provided for safety purpose across the open face of each broiler. The screen 23 provides a more even distribution of the heat into the cooking chamber and prevents the flames of the burners 16 from searing the carcasses 11.

A drip pan 26 extends across the bottom of the cooking chamber 2 to receive any grease drippings. The drippings are collected through a drain 27 into a bucket 28 located within the base housing 3.

The placement of the broilers in the upper part of the cooking chamber reduces the risk of grease fire in the drip pan.

An access door 29, 30 is provided in the left half of each circular wall 4, 5 each door has a pair of glass windows 31 equipped with refractory glass panels. It shall be noted that the broilers 14, 15 face each other, and so do the access doors 29, 30. Either door can be opened to load or dress the meats while the broilers are operating without exposing the operator to burning heat.

A boiler 32 located in the base compartment 3 uses a gas burner 33 fed by the propane tank 20 to boil water held in a reservoir 34. A duct 35 feeds the steam generated by the boiler 32 to a nozzle 36 located in the bottom of the cooking chamber 2. The water in the reservoir of the boiler is kept a constant level 37 by means of a tank 38 to which it is connected by a line 39 at the bottom of the reservoir 34. A float 40 in the tank controls a valve 41 on the water supply line 42. As the water evaporates in the boiler 32, the lowering of the float 40 opens the valve 41 returning the reservoir 34 and the tank 38 to the constant water level 37. The separate respective locations of the broilers and boiler prevents interference between the two heating systems and independent control of each system.

Housed within the base enclosure is mechanism for injecting sauces or seasonings into the carcasses before or after they are loaded on the rack 7. The mechanism 43 comprises a container 44 for holding sauce or seasoning. The container is filled through a sealable port 45 which opens on the counter top portion 46 of the base 3. The container feeds a compressing cylinder 47 which is driven by an electrical motor 48, the mechanism 43 is activated by means of a foot pedal 49, the compressing cylinder 47 is connected through a hose 50 to a hand-held injector 51. The injector has a tip 52 which is sharpened and adapted to penetrate the meat of the carcasses 11. The dispensing of the sauce or seasoning through the injector 51 may be controlled by means of a trigger 53, which may be sprayed upon or injected into the meats.

A control panel 54 is mounted on the housing of the rack motor 13 and coupling mechanism 12, and holds switches necessary to activate the rotisserie. A vent 55 in the roof of the cooking chamber 2 has an adjustable butterfly valve 56. The base enclosure 3 is provided with a plurality of doors for ease of maintenance and servicing of the equipment housed therein.

It should be noted that the steam injection system uses a unrestricted nozzle 36, so that no steam pressure is allowed to build up inside the boiler reservoir 34. It has been found that a limited but steady supply of steam vapors within the cooking chamber 2 is sufficient to allow a fast, even and thorough cooking of the meats. It should be understood that the arrangement of the various components housed within the base enclosure 3 is a matter of convenience and design choice.

While the preferred embodiment of the invention has been described, modifications and improvements may be made and other embodiments may be devised without departing from the spirit of the invention and the scope of the appended claims.

What is claimed is:

1. A rotisserie for the controlled cooking of a plurality of chicken carcasses or other meats which comprises:
   a cooking chamber;
   a planar rack rotatively mounted within the chamber, the rack being shaped and dimensioned to support said meats;
   at least one broiler associated with said chamber;
   means for introducing a stream of steam into the chamber; and
   means for rotating said rack to successively move said meats past said broiler;
   wherein:
   said planar rack is held in a generally vertical plane and has means for securing said meats on either side of said plane;
   said means for rotating comprises means for turning said rack within said vertical plane and about a horizontal axis passing through the center of gravity of the rack.

2. The rotisserie of claim 1, wherein said chamber comprises:
   two vertical walls generally parallel to, and respectively on either side of said rack, each of said vertical walls having an access door; and
   a broiler mounted within each of said vertical walls.

3. The rotisserie of claim 2, wherein said means for introducing steam comprises:
   a boiler;
   a water tank;
   means for maintaining a constant volume of water from said water tank in said boiler; and
   a steam duct connecting said boiler to said chamber.

4. The rotisserie of claim 3 which further comprises means for introducing a seasoning fluid to said meats.

5. The rotisserie of claim 4, wherein said means for introducing comprises:
   a hand-held injector having a tip shaped and dimensioned to penetrate said carcasses; and
   means for compressing said seasoning fluid and forcing it through said injector.

6. The rotisserie of claim 4, wherein each of said broilers comprises:
   a combustion box;
   at least one burner; and
   a screen of volcanic rock between said burner and said rack.

7. The rotisserie of claim 2, wherein said means for turning comprises:
   a shaft connected to said rack, mounted about said horizontal axis and passing through one of said vertical walls;
   an electrical motor; and
   a mechanical assembly coupling said motor to said shaft.

8. The rotisserie of claim 3, wherein said means for maintaining a constant volume of water comprises:
   said boiler and said water tank being held at the same general level;
   a connecting line between the lower part of the water tank and the lower part of said boiler;
   a float inside said water tank; and
   a valve connected to the end of a water line, the opening of said valve being controlled by the position of said float.

9. A rotisserie for the controlled cooking of a plurality of products which comprises:
   a generally circular cooking chamber defined between two circular, parallel, and vertical walls;
   a circular rack rotatively mounted equidistant between said walls, said rack having means for attaching said products thereupon;
   means for injecting a steady stream of steam into the chamber;
   one broiler mounted within each of said walls, each of said broilers comprising at least one gas burner and a screen of volcanic rock between said burner and the interior of said chamber;
   each of said vertical walls having an access door;
   a means for turning said rack about an axis generally passing through the center of each of said walls; and
   means for injecting a seasoning fluid into said products.

* * * * *